R. S. LA RUE.
SHAPER.
APPLICATION FILED JAN. 24, 1913.

1,069,439.

Patented Aug. 5, 1913.
2 SHEETS—SHEET 1.

WITNESSES

Geo N Naylor
A. L. Kitchin.

INVENTOR
RICHARD S. LA RUE,
BY
ATTORNEYS

R. S. LA RUE.
SHAPER.
APPLICATION FILED JAN. 24, 1913.

1,069,439.

Patented Aug. 5, 1913.
2 SHEETS—SHEET 2.

WITNESSES
Geo. N. Naylor
A. L. Kitchin.

INVENTOR
Richard S. La Rue,
BY Munn & Co.
ATTORNEYS

UNITED STATES PATENT OFFICE.

RICHARD S. LA RUE, OF BELLEFONTAINE, OHIO.

SHAPER.

1,069,439. Specification of Letters Patent. Patented Aug. 5, 1913.

Application filed January 24, 1913. Serial No. 743,905.

*To all whom it may concern:*

Be it known that I, RICHARD S. LA RUE, a citizen of the United States, and a resident of Bellefontaine, in the county of Logan and State of Ohio, have invented a new and Improved Shaper, of which the following is a full, clear, and exact description.

This invention relates to improvements in shapers, and particularly to shaping rings designed to be used with the cutting head of a planing or other similar machine, and has for an object the provision of a structure which will cause the cutting or planing knives to follow a certain shape or form.

A further object of the invention is to provide a pair of guiding rings on a cutting head so as to guide various shaped forms as the same pass over the cutting head whereby the cutting knives may shape an article according to the forms used.

In carrying out the objects of the invention, a cutter head of any desired kind may be used with any desired form of cutters. To the cutter head is clamped in any desired way a pair of adjustable rings designed to support forms. Connected with the forms supported by the guiding rings, are strips of material to be shaped or cut so that as the forms move over the rings and consequently move up and down according to the shape of the forms, the cutters of the head will cut the edge of the material according to the shape of the forms. The forms may be of any desired shape, provided a suitable contact surface is provided for engagement with the rings. The supporting rings are preferably made perfectly round and formed with projections designed to be adjustably clamped to the head so that the rings may be separated to a greater or less extent according to the article being cut and according to the size and shape of the cutting blade.

A practical embodiment of the invention is represented in the accompanying drawings forming a part of this specification, in which similar characters of reference indicate corresponding parts in all the views.

Figure 1:
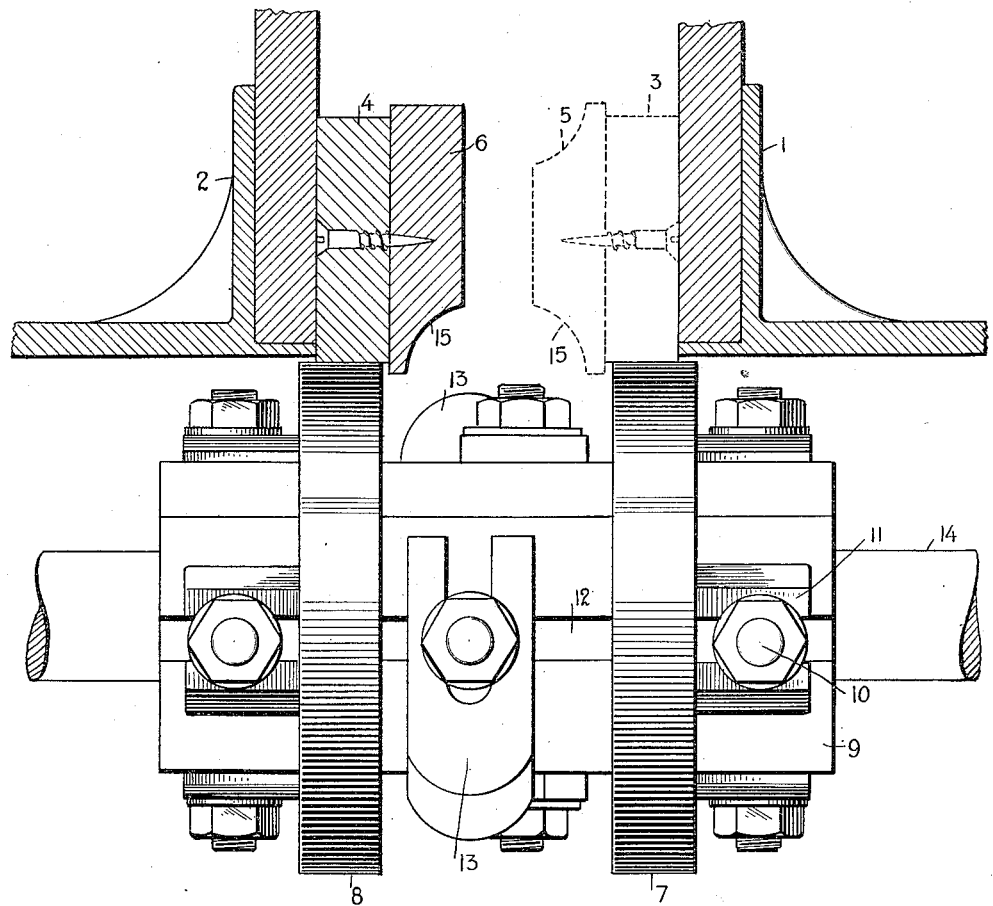
Figure 2:
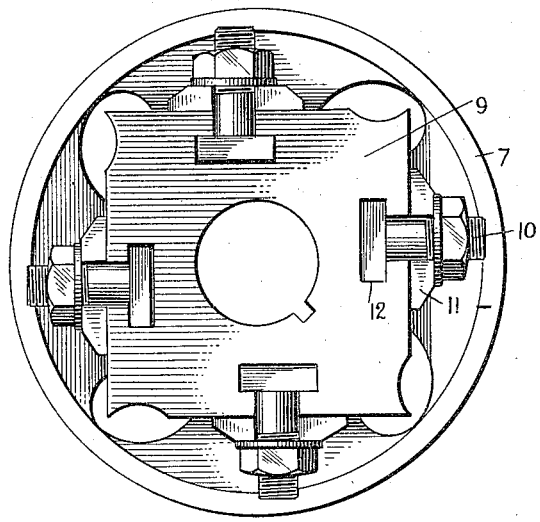
Figure 3:
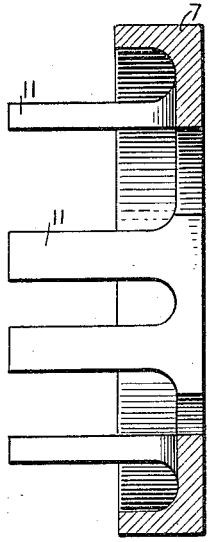

Figure 1 is a side view of a cutter with an embodiment of the invention applied thereto, a form and guides being shown in connection therewith; Fig. 2 is an end view of a cutter head having secured thereto a ring embodying the invention; and Fig. 3 is a longitudinal vertical section through a ring or shaping device embodying the invention.

Referring to the accompanying drawings by numerals, 1 and 2 indicate guiding brackets for guiding the forms or patterns 3 and 4 against spreading or moving laterally. The forms or patterns 3 and 4 may be perfectly flat and straight on the bottom, scalloped, or of any desired shape, according to the shape desired to be formed upon the material 5 and 6. The forms 3 and 4 are designed to rest upon the shaping rings 7 and 8, which rings are rigidly secured to the cutter head 9 by suitable bolts 10 passing through bifurcated extensions 11. The bolts 10 are of the usual structure used in connection with the cutter head 9, and are designed to be fitted into the usual slots 12 formed therein. Any desired number of the bifurcated extensions 11 may be used for holding the rings 7 and 8 in place without departing from the spirit of the invention. By this construction and arrangement it will be observed that the rings 7 and 8 may be adjusted longitudinally of the cutter head so as to accommodate various sized patterns.

In operation, when it is desired to shape members 5 and 6, the cutters 13 are arranged properly in the cutter head 9 and the rings 7 and 8 are also properly positioned for supporting the forms or patterns 3 and 4. The shaft 14 carrying the head 9 is then rotated in the usual manner, while the forms 3 and 4 are forced over the cutter head. The forms 3 and 4 may rest by gravity on the rings 7 and 8, or may be pressed thereon by a spring or any other desired means whereby the members 5 and 6 are held in proper position for engagement by the respective cutters 13. These members 5 and 6 may be connected with the forms 3 and 4 by screws or in any other way. By constructing and arranging the rings 7 and 8 adjustably on the cutter head, a shaper is produced for the ordinary planing head which will shape various formed articles, as 5 and 6, according to the shape of the patterns or forms 3 and 4. It will be noted that the patterns 3 and 4 will move toward and from shaft 14, as the same are forced longitudinally over the rollers 7 and 8, provided indentations or notches are formed in the forms. It will be evident that if only an arc-shaped gouged out portion 15 is desired on a perfectly rectangular piece of material, the forms 3 and 4 may be perfectly straight upon the lower edge so that the same will travel in a straight line across the cutter head.

Having thus described my invention, I claim as new and desire to secure by Letters Patent,—

1. In a device of the character described, the combination with a cutter head, of a guiding ring mounted on the cutter head, said guiding ring being formed with a circular periphery and an axially extending bifurcated member, and a clamping member connected with said head and projecting through said bifurcated member for clamping the bifurcated member rigidly to the cutter head whereby the ring is rigidly held in position on said cutter head.

2. In a device of the character described, the combination with a cutter head formed with longitudinal bolt receiving slots, of a ring encircling the said cutter head formed with a plurality of axially extending bifurcations mating with certain of said slots, and a bolt extending through each of said bifurcated extensions and into the registering slot for clamping said ring to said head.

3. In a device of the character described, the combination with a cutter head formed with longitudinal slots and cutter clamping means arranged in part of said slots, of a removable and adjustable guiding ring surrounding said cutter head, said ring being formed with a laterally extending bifurcated member, said bifurcated member extending longitudinally of the cutter head and substantially parallel with a slot in the cutter head whereby the ring may be adjusted longitudinally of the cutter head and clamped at substantially any point, and a clamping bolt having one end arranged in the slot in the cutter head and the other projecting through said bifurcated extension, said clamping bolt being formed with a clamping member acting against said projection for firmly clamping the same in place.

4. In a device of the character described, the combination with a cutter head formed with a plurality of longitudinal slots designed to receive knife clamping means, of a ring surrounding said cutter head formed with a pair of projections for each slot, each of said projections extending parallel to its co-acting slot, and a clamping bolt extending through each of said bifurcated projections and into the registering slot for clamping the various bifurcations in place for rigidly holding said ring in position.

In testimony whereof I have signed my name to this specification in the presence of two subscribing witnesses.

RICHARD S. LA RUE.

Witnesses:
PHILIP HORNER,
GEO. F. SHANER.

Copies of this patent may be obtained for five cents each, by addressing the "Commissioner of Patents, Washington, D. C."